United States Patent [19]

Miwa et al.

[11] Patent Number: 5,021,284
[45] Date of Patent: Jun. 4, 1991

[54] ELECTROCONDUCTIVE INTEGRATED SUBSTRATE AND PROCESS FOR PRODUCING THE SAME

[75] Inventors: Kishio Miwa; Hiroaki Fukui; Fumiaki Noma, all of Shiga, Japan

[73] Assignee: Toray Industries, Inc., Tokyo, Japan

[21] Appl. No.: 315,115

[22] Filed: Feb. 24, 1989

[30] Foreign Application Priority Data

Feb. 24, 1988 [JP] Japan ................................. 63-43084
Jun. 2, 1988 [JP] Japan ............................... 63-136282

[51] Int. Cl.$^5$ ............................................. B32B 9/00
[52] U.S. Cl. .................................. 428/166; 156/306.6; 428/167; 428/188; 428/408
[58] Field of Search ............... 428/166, 167, 188, 408; 156/306.6

[56] References Cited

U.S. PATENT DOCUMENTS 4,732,637 3/1988 Wettling et al. ..................... 428/408
4,818,640 4/1989 Fukuda et al. ....................... 428/408

FOREIGN PATENT DOCUMENTS

53-18603 6/1978 Japan .
53-43920 11/1978 Japan .
63-48763 3/1983 Japan .
61-19069 1/1986 Japan .
61-50912 11/1986 Japan .
62-29207 6/1987 Japan .
62-211868 9/1987 Japan .

Primary Examiner—William J. Van Balen
Attorney, Agent, or Firm—Birch, Stewart, Kolasch & Birch

[57] ABSTRACT

An electroconductive integrated substrate and a process for producing the same, which comprises a porous carbonaceous plate having a large number of pores and gas permeability, and a gas unpermeable electroconductive plate laminated on the porous carbonaceous plate and integrally bonded thereto by thermoplastic resin which is present substantially only in the pores of the porous carbonaceous plate. It is preferred to use thermoplastic resin having a melting viscosity of from $10^2$ to $10^6$ poises, and a gas permeable porous carbonaceous plate having a mean pore diameter of from 20 to 150 μm and a porosity of from 40 to 85%. The porous carbonaceous plate and the gas impermeable electroconductive plate are laminated one upon the other with a thermoplastic resin film interposed therebetween, and the film is melted to bond the plates together. The integrated substrate obtained has an electrical resistance of not greater than 7 mΩ, preferably not greater than 1.5 mΩ, at the bonded surface in the thickness direction thereof.

18 Claims, 6 Drawing Sheets

ELECTROCONDUCTIVE INTEGRATED SUBSTRATE AND PROCESS FOR PRODUCING THE SAME

BACKGROUND OF THE INVENTION

This invention relates to an electroconductive integrated substrate and a process for producing the same which is suitable for a functional element of an electrode substrate unit, fuel or oxidative gas passage unit, cooling unit and the like for a fuel cell containing acid or alkali as an electrolyte, particularly a phosphoric acid fuel cell, or a membrane fuel cell using an ion-exchange membrane as an electrolyte, and a functional element of an electrode substrate unit etc. for secondary batteries of electrolyte circulation type.

A fuel cell is, as is known in the art, structured by stacking a plurality of electrode substrate units each comprising a gas separating plate with electroconductivity sandwiched between gas permeable electrode substrates with electroconductivity. In such a unit, if the electrical contact resistance at the surface between the gas separating plate and the electrode substrate is large, the voltage drop is naturally great when a current is passed in the stacking direction and, in the case of fuel cell, the electric efficiency is low.

To overcome this problem, an electrode substrate unit has been proposed, for example, in Japanese Laid-Open Patent Publication No. 61-19069, wherein porous electrode substrates with gas permeability, made of carbon fibers, are bonded to both surfaces of a carbonaceous gas separating plate with electroconductivity by a phenolic resin and then the resulting structure is heat treated to carbonize the resin. Since the resin is carbonized, this unit has a lower electrical contact resistance as compared to a structure in which the gas separating plate and the porous electrode substrates are merely laminated. There is, however, the problem that the manufacturing cost is high because of the necessity of the heat treatment step. Moreover, since the resin shrinks during the heat treatment step, the unit may be warped or fail to provide sufficient bonding strength, causing the problem of the bonded surfaces being separated. Naturally, these inconveniences are more prominent in the case of larger-sized area unit.

In Japanese Laid-Open Patent Publication No. 62-211868 is disclosed an electroconductive gas separating plate which is fabricated by sandwiching a thermoplastic resin film between two porous carbonaceous plates with gas permeability and bonding these together with application of heat and pressure to form an integral structure. As the thermoplastic resin film, the Japanese Publication discloses using a polytetrafluoroethylene (PTFE) film. However, because of its melting viscosity as high as $10^{10}$–$10^{13}$ poises, PTFE, if melted with application of heat, does not penetrate satisfactorily into the pores of the gas permeable porous carbonaceous plate and thus fails to provide sufficient bonding strength. Furthermore, PTFE remains in the form of a thick layer at the bonded surfaces. Therefore, the electrical resistance at the bonded surfaces of adjacent gas permeable porous carbonaceous plates are large.

Japanese Laid-Open Patent Publication No. 63-48763 discloses an electrode substrate for a fuel cell, which is produced by bonding a porous carbonaceous plate and a separator by a "Teflon" dispersion. The "Teflon" dispersion is prepared by dispersing 10–70% by weight of polytetrafluoroethylene (PTFE), and after this dispersion is applied to the bonding surface of the separator, the porous carbonaceous plate is attached to the bonding surface of the separator and the two are bonded together with application of heat and pressure. The electrode substrate obtained in this manner is, however, poor in electroconductivity due to the use of PTFE dispersion, and it is difficult to apply PTFE uniformly to the bonding surface, thus failing to provide a desired bonding strength.

OBJECTS AND SUMMARY OF THE INVENTION

A primary object of this invention is to provide an electroconductive integrated substrate which solves the above-mentioned problems associated with conventional electroconductive integrated substrates and which has low electrical resistance at the bonded surfaces and thus is best suited for a functional element of an electrode substrate unit, gas passage unit, cooling unit and the like for various types of fuel cell.

Another object of the invention is to provide an electroconductive integrated substrate which, when used to form a unit, is free from warp and separation at the bonding surface.

Still another object of the invention is to provide a process for producing an electroconductive integrated substrate which does not require a heat treatment step after bonding, unlike the aforementioned conventional methods, and which can be manufactured at low cost.

According to the present invention, an electroconductive integrated substrate is provided which comprises a porous carbonaceous plate having a large number of gas permeable pores, and a gas impermeable electroconductive plate laminated on the porous carbonaceous plate and integrally bonded thereto by thermoplastic resin which is present substantially only in the pores of the porous carbonaceous plate.

Preferably, the thermoplastic resin has a melting viscosity of from $10^2$ to $10^6$ poises, and consists of one or more selected from the group of a copolymerizate of tetrafluoroethylene and perfluoroalkylvinylether, a copolymerizate of tetrafluoroethylene and hexafluoropropylene, polyether sulfone, polyvinyl chloride, polyvinylidene chloride, polyethylene, polypropylene, polyamide, polysulfone, polyester, polyphenylene sulfide, polyether sulfone, polyetheretherketone, polyvinylidene fluoride, fluorine-contained polyester, and fluorine-contained acrylic acid resin.

The gas permeable porous carbonaceous plate preferably has a mean pore diameter of from 20 to 150 $\mu$m and a porosity of from 40 to 85%, and comprises short carbon fibers, having a diameter of single fiber of from 4 to 15 $\mu$m and a fiber length of from 2 to 20 mm, which are randomly dispersed within substantially a 2-dimensional plane and are bonded with each other by carbon, e.g., carbonized resin.

The electroconductive integrated substrate of the invention is produced by laminating a porous carbonaceous plate having a large number of gas permeable pores and a gas impermeable electroconductive plate one upon the other with a thermoplastic resin film, preferably having a thickness of from 10 to 200 $\mu$m, interposed therebetween, and heating the laminated structure thus obtained under pressure, thereby melting the thermoplastic resin film to bond the porous carbonaceous plate and the gas unpermeable electroconductive plate together.

The porous carbonaceous plate may integrally be bonded to only one surface of the gas unpermeable electroconductive plate or to both surfaces of the same.

The electroconductive integrated substrate according to the invention has an electrical resistance $\Delta R$ of not greater than 7 m$\Omega$, preferably not greater than 1.5 m$\Omega$, at a bonded surface thereof in the thickness direction, in accordance with the following formula:

$$\Delta R = \left(R - \sum_{i=1}^{N} Ri\right)/(N - 1)$$

where R and Ri represent, respectively, the electrical resistance (m$\Omega$) in the thickness direction of the bonded structure comprising j porous carbonaceous plates (j=1 or more) and k gas impermeable electroconductive plates (k=1 or more), and the electrical resistance (m$\Omega$) in the thickness direction of an i-th one of the j porous carbonaceous plates and the k gas impermeable electroconductive plates constituting the bonded structure, and N represents the total number of the j porous carbonaceous plates and the k gas impermeable electroconductive plates bonded together, i.e., $N=j+k$, the electrical resistance in the thickness direction being calculated from a voltage drop per unit area (1 cm$^2$) measured when a current of 100 mA is passed per unit area between electrodes sandwiching a plate to be measured therebetween.

The above and other objects, features and advantages of the present invention will become more apparent from the ensuing detailed description taken in conjunction with the accompanying drawings.

DETAILED DESCRIPTION

An electroconductive integrated substrate according to the present invention has a laminated structure comprising a porous carbonaceous plate with gas permeability and an electroconductive plate with gas unpermeability, the two plates being bonded together at their laminating surfaces. To bond these two plates, the gas permeable porous carbonaceous plate may be bonded to only one surface of the gas impermeable electroconductive plate or to both surfaces of the same. On the contrary, the electroconductive plate with gas impermeability may be bonded to one surface of the gas permeable porous carbonaceous plate. A desired laminated structure may be employed depending on the applications of the integrated substrate. Furthermore, the gas permeable porous carbonaceous plate and the gas impermeable electroconductive plate may be both in the form of a totally flat plate, or a non-flat plate obtained by mechanical machining. The shape of the plates may vary depending on their applications. The gas permeable porous carbonaceous plate is usually provided with a gas seal at opposite side portions thereof, to prevent leakage of gases therefrom.

The gas permeable porous carbonaceous plate is preferably formed by dispersing short carbon fibers (e.g., diameter of single fiber: 4–15 $\mu$m; fiber length: 2–20 mm) in random directions within a substantially 2-dimensional plane and bonding the short fibers by carbon, e.g., carbonized resin, and has interconnected pores and thus is permeable to gases in the thickness direction as well as in the directions along the surface thereof. This type of gas permeable porous carbonaceous plate can not only achieve high strength of bonding with the gas unpermeable electroconductive plate, but also serve to lower the electrical resistance at the contact surfaces. The gas permeable porous carbonaceous plate of this type is disclosed, for example, in Japanese Patent Publications No. 53-18603 and No. 53-43920, in which the porous carbonaceous plate is fabricated by a paper making method.

Alternatively, the gas permeable porous carbonaceous plate may be produced by molding a mixture of short carbon fibers (e.g., diameter of single fiber: 4–15 $\mu$m; fiber length: 0.1–1 mm) and a resin carbonizable by heat treatment step, such as phenolic resin, into a desired shape and heat treating the mixture. In this case, the short carbon fibers lie randomly in three dimensions. This type of gas permeable porous carbonaceous plate produced by a molding method is disclosed in Japanese Patent Publications No. 61-50912 and No. 62-29207, example. The porous carbonaceous plate of this type may be used in combination with the above-mentioned porous carbonaceous plate in which short carbon fibers are dispersed 2-dimensionally, depending on the applications.

The mean pore diameter and porosity of the gas permeable porous carbonaceous plate vary depending on the diameter and quantity of the short carbon fibers used, the amount of carbonizable resin, etc. In order to ensure firm bonding with the gas impermeable electroconductive plate and avoid the electrical resistance at the bonded surfaces being increased, the gas permeable porous carbonaceous plate preferably has a mean pore diameter ranging from 20 to 150 $\mu$m and a porosity ranging from 40 to 85%. Still preferred ranges of mean pore diameter and porosity are 20 to 60 $\mu$m and 50 to 80%, respectively.

It is noted that the term "porous carbonaceous plate" covers also an electroconductive plastic plate formed by molding a mixture of an electroconductive material, such as carbon powder, short carbon fibers or the like, and a resin into a desired shape, and a porous plate containing graphite.

The electroconductive plate with gas impermeability, on the other hand, may be a high-density carbon plate, a glassy carbon plate, an electroconductive plastic plate formed by molding a mixture of an electroconductive material, such as carbon powder, short carbon fibers or the like, and a resin into a desired shape, a graphite plate formed by heating graphite powder which has been subjected to oxidation treatment, to obtain expanded graphite powder and then compression molding the powder, or a metal plate such as an electrolytic copper plate, an aluminum plate, or a stainless steel plate which are coated with electroconductive resin. The gas impermeable electroconductive plate has electroconductivity but is scarcely permeable to gases in the thickness direction. The thickness of the electroconductive plate may be set suitably depending on its applications. To increase the strength of bonding with the gas permeable porous carbonaceous plate, the gas impermeable electroconductive plate may be subjected to surface roughening treatment beforehand.

The gas permeable carbonaceous plate and the gas impermeable electroconductive plate, described above, are bonded integrally to each other by a thermoplastic resin consisting of one or more selected from the group of a copolymerizate of tetrafluoroethylene and perfluoroalkylvinylether (PFA), a copolymerizate of tetrafluoroethylene and hexafluoropropylene (PFEP), and polyether sulfone (PES), to obtain an electroconductive integrated substrate. Thus, the electroconductive integrated substrate is constructed by use of the thermoplastic resin which is thermally and chemically stable, and accordingly is most suited for constituting the aforementioned functional element of a fuel cell using an electrolyte of phosphoric acid which is corrosive at high temperatures, 200° C., for example.

In the case of a membrane fuel cell, for example, which is operated at relatively low temperature and does not require high chemical resistance, the thermoplastic resin may consist of one or a mixture of polyvinyl chloride, polyvinylidene chloride, polyethylene, polypropylene, polyamide, polysulfone, polyester, polyphenylene sulfide, polyetheretherketone, polyvinylidene fluoride, fluorine-contained polyester, and fluorine-contained acrylic acid resin.

The thermoplastic resins mentioned above have a melting viscosity of as low as $10^2$ to $10^6$ poises. Therefore, in the bonding step described hereinafter, the thermoplastic resin penetrates satisfactorily into the pores of the gas permeable porous carbonaceous plate and remains substantially only in the pores of the porous carbonaceous plate, thus enabling the electrical resistance at the bonded surfaces to be greatly reduced. The porous carbonaceous plate has a large number of pores and accordingly is not smooth-surfaced. Therefore, if viewed microscopically, the surface of the porous carbonaceous plate is difficult to be defined decisively, and there may be a case where the thermoplastic resin is partly left in the form of layer between the gas permeable porous carbonaceous plate and the gas impermeable electroconductive plate. Nevertheless, resin remaining in the form of layer at the bonded surfaces was not observed so clearly as in the case of using PTFE mentioned above.

The melting viscosity was measured by using a capillary viscometer under the method as defined by ASTM, D-1238. The temperature for measurement was selected from within the range of from 10° C. to 70° C. above the melting point or softening point of the thermoplastic resin.

Using the thermoplastic resin, the gas permeable porous carbonaceous plate and the gas impermeable electroconductive plate are bonded together in the following manner.

A film made of the above-mentioned thermoplastic resin and having a thickness of from 10 to 200 $\mu$m is interposed between the gas permeable porous carbonaceous plate and the gas impermeable electroconductive plate, and the film is melted under pressure to bond the two plates together. The pressure applied at this time may be 5–20 kgf/cm$^2$. After this step, the bonded structure is preferably cooled down to or close to room temperature and then released from the applied pressure. As the thermoplastic resin film, it is preferred to use a porous film having a plurality of small pores with a pitch of the order of several millimeters to several centimeters, since air enclosed within the bonded structure is let out through the pores during the bonding step.

In carrying out the bonding step, careful consideration must be given to the thickness of the thermoplastic resin film to be used so that the amount of the thermoplastic resin may not be unnecessarily large. If the thermoplastic resin is excessive, a thick layer of the thermoplastic resin, which is electrically insulating, is formed between the gas permeable porous carbonaceous plate and the gas unpermeable electroconductive plate, thus causing an increase of the electrical resistance at the bonded surfaces.

Preferably, to improve the bonding strength between the gas permeable porous carbonaceous plate and the gas unpermeable electroconductive plate and also to avoid the electrical resistance at the bonded surfaces being increased, the gas permeable porous carbonaceous plate have a mean pore diameter ranging from 20 to 150 $\mu$m and a porosity ranging from 40 to 80%, as mentioned above.

If the mean pore diameter is less than 20 $\mu$m, the molten thermoplastic resin may not penetrate sufficiently into the gas permeable porous carbonaceous plate; whereas if the mean pore diameter exceeds 150 $\mu$m, recesses may be formed in the thermoplastic resin corresponding in position to the pores of the gas permeable porous carbonaceous plate and thus the bonding strength obtained will be insufficient, though this phenomenon depends on the amount of the thermoplastic resin used. The pore diameter can be measured with a mercury porosimeter, conventionally known. The mean pore diameter is here defined as 50% of the accumulated pore volume.

The electroconductive integrated substrate of the present invention has electrical resistance $\Delta R$ of not greater than 7 mΩ, preferably not greater than 1.5 mΩ, at the bonded surfaces in the thickness direction. The electrical resistance in the thickness direction was calculated from a voltage drop per unit area (1 cm²) measured when a current of 100 mA was passed per unit area between mercury electrodes sandwiching an object to be measured therebetween. This procedure was followed in measurement of the electrical resistance in the thickness direction of the gas permeable porous carbonaceous plate and the gas impermeable electroconductive plate, described hereinafter, unless otherwise explicitly defined. The electrical resistance ΔR of the electroconductive integrated substrate at the bonding surface thereof is defined as $$\Delta R = \left( R - \sum_{i=1}^{N} Ri \right) / (N - 1)$$

where R and Ri represent, respectively, the electrical resistance (mΩ) in the thickness direction of the bonded structure comprising j porous carbonaceous plates (j=1 or more) and k gas unpermeable electroconductive plates (k=1 or more), and the electrical resistance (mΩ) in the thickness direction of an i-th one of the j porous carbonaceous plates and the k gas impermeable electroconductive plates constituting the bonded structure, and N represents the total number of the j porous carbonaceous plates and the k gas impermeable electroconductive plates bonded together, i.e., N=j+k.

In order to improve the bonding strength, the aforementioned porous carbonaceous plate in which short carbon fibers are dispersed randomly substantially within a 2-dimensional plane is preferably used. If such porous carbonaceous plate is used, the thermoplastic resin, when introduced into the pores, surrounds the carbon fibers and bonds the porous carbonaceous plate to the gas unpermeable electroconductive plate with a bridge-like structure. Thus, not only firm bonding is ensured even with a small amount of thermoplastic resin but the electrical resistance at the bonded surfaces can be drastically lowered.

Preferred embodiments of the present invention will now be described.

Figure 1:
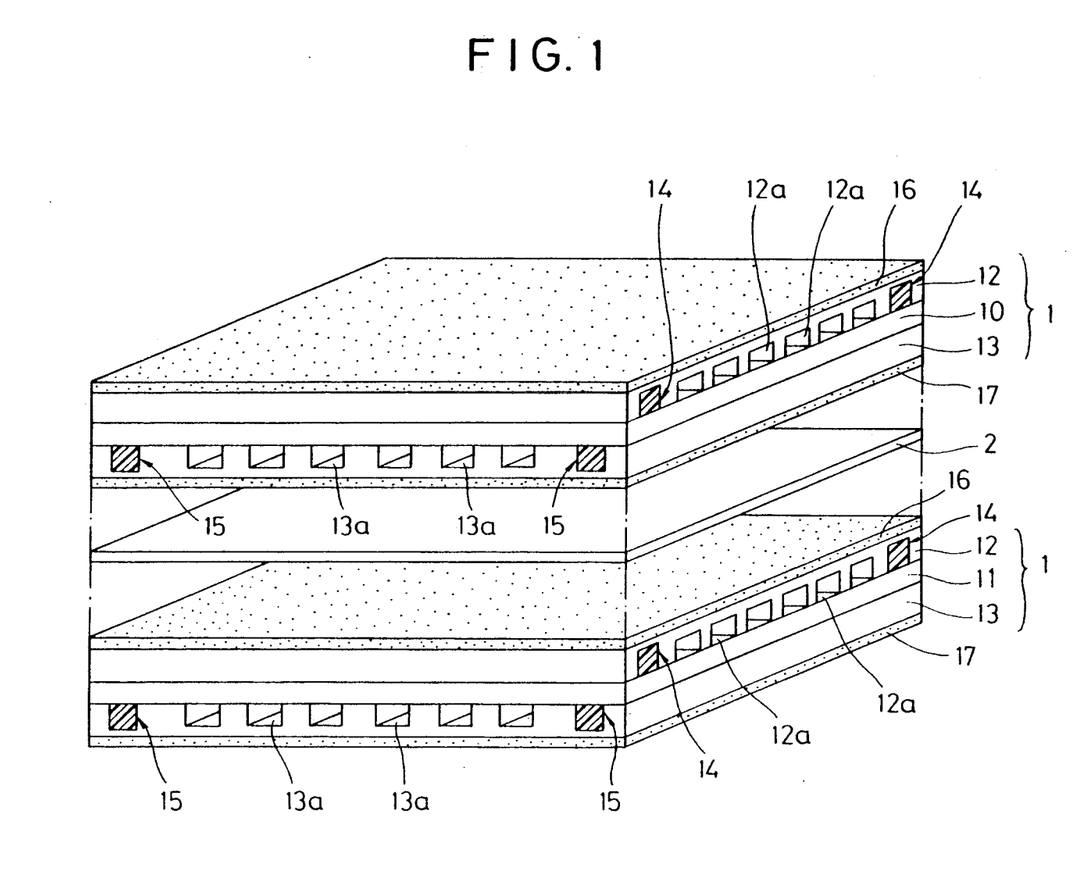
FIG. 1 is a perspective view of an electrode substrate unit for a phosphoric acid fuel cell in which is used an electroconductive integrated substrate according to the invention.

FIG. 1 shows electrode substrate units 1 for a phosphoric acid fuel cell, each unit comprising a planar gas impermeable electroconductive plate 10 and gas permeable porous carbonaceous plates 12 and 13 bonded to respective opposite surfaces of the electroconductive plate 10. The carbonaceous plates 12 and 13 have a plurality of parallel grooves 12a and 13a for gas passage, respectively, formed in one surface thereof bonded to the corresponding surface of the electroconductive plate 10, and have the other surface thereof (the surface contacting a matrix layer 2 referred to later) provided with catalyst layers 16 and 17, respectively, containing a platinum or platinum series catalyst or the like. The carbonaceous plates 12 and 13 are bonded to the plate 10 such that the grooves 12a of the plate 12 are at right angles to the grooves 13a of the plate 13. The phosphoric acid fuel cell is constructed by stacking a multiplicity of such electrode substrate units 1 provided with catalyst layers, with a matrix layer 2, which contains a phosphoric acid electrolyte, interposed between the adjacent units. One of the two carbonaceous plates, i.e., the plate 12, serves as a gas permeable electrode substrate for an oxidative gas (usually, air), and the other carbonaceous plate 13 serves as a gas permeable electrode substrate for a fuel gas (hydrogen gas etc.); whereas the electroconductive plate 10 serves as a separator for separating the two gases, i.e., the oxidative gas and the fuel gas. The oxidative gas and the fuel gas are introduced respectively into the plural grooves 12a and 13a of the carbonaceous plates 12 and 13. The carbonaceous plates 12 and 13 are respectively provided with gas seals 14 and 15 located at opposite side portions thereof and extending parallel to their respective grooves 12a and 13a.

In the above embodiment, like the embodiments to be described hereinafter, the gas permeable porous carbonaceous plate and the gas unpermeable electroconductive plate are bonded together by the aforementioned thermoplastic resin which is present substantially solely in the pores of the gas permeable porous carbonaceous plate, or by such resin in the pores plus the thermoplastic resin in the form of very thin layer present between the two plates. The thermoplastic resin layer, however, cannot be observed so clearly as in the case of using PTFE, as mentioned above.

Figure 2:
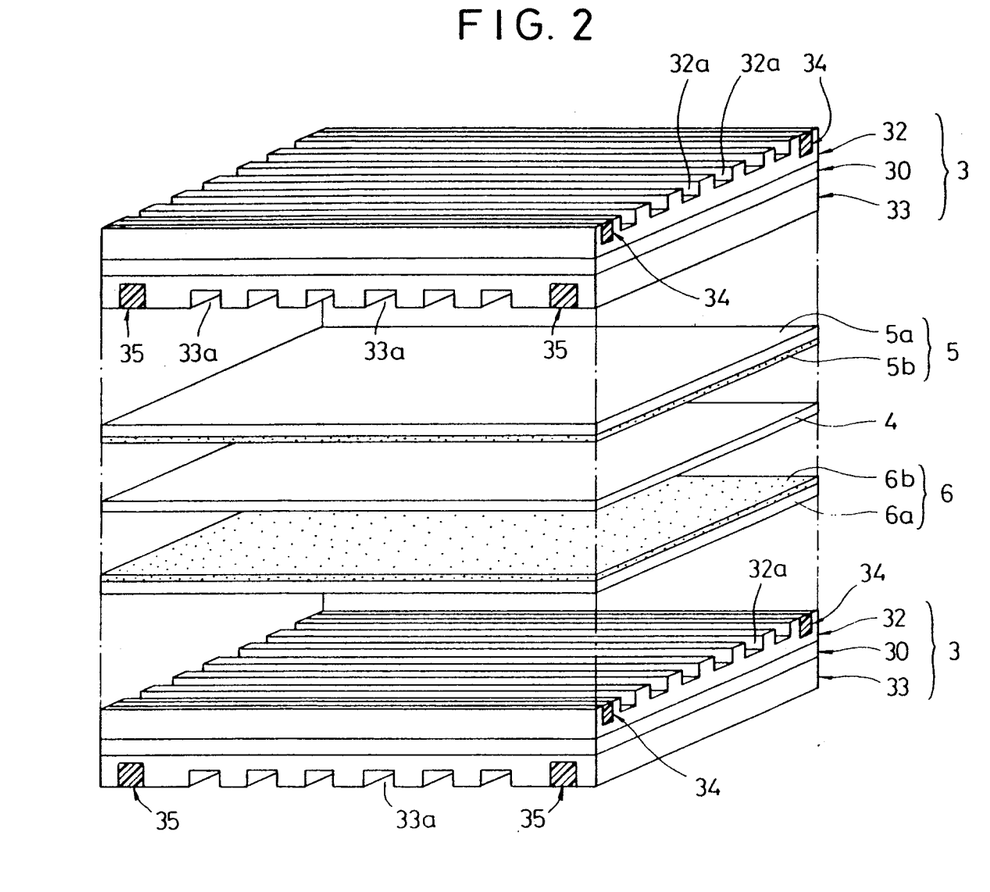
FIG. 2 is a perspective view of a gas passage unit for a phosphoric acid fuel cell in which is used an electroconductive integrated substrate according to the invention.

FIG. 2 shows gas passage units 3 for a phosphoric acid fuel cell, each consists of a planar gas impermeable electroconductive plate 30 and gas permeable porous carbonaceous plates 32 and 33 respectively bonded to each of opposite surfaces of the electroconductive plate 30. The carbonaceous plates 32 and 33 have plural parallel gas passage grooves 32a and 33a, respectively, formed in one surface thereof opposite to that bonded to the electroconductive plate 30, and are bonded to the plate 30 in such a manner that the grooves 32a of the carbonaceous plate 32 are at right angles to the grooves 33a of the plate 33. The phosphoric acid fuel cell using the gas passage unit 3 is constructed by repeatedly stacking the gas passage unit 3, an air electrode 5, a matrix layer 4, and a fuel electrode 6 in the order mentioned. The air electrode 5 and the fuel electrode 6 include electrode substrates 5a and 6a, respectively, carrying catalyst layers 5b and 6b on the surface thereof facing the matrix layer 4. An oxidative gas and a fuel gas are introduced respectively in the plural grooves 33a and 32a of the carbonaceous plates 33 and 32.

The carbonaceous plates 32 and 33 are provided with gas seals 34 and 35, respectively, located at opposite side portions thereof and extending parallel to their respective grooves 32a and 33a.

Figure 3:
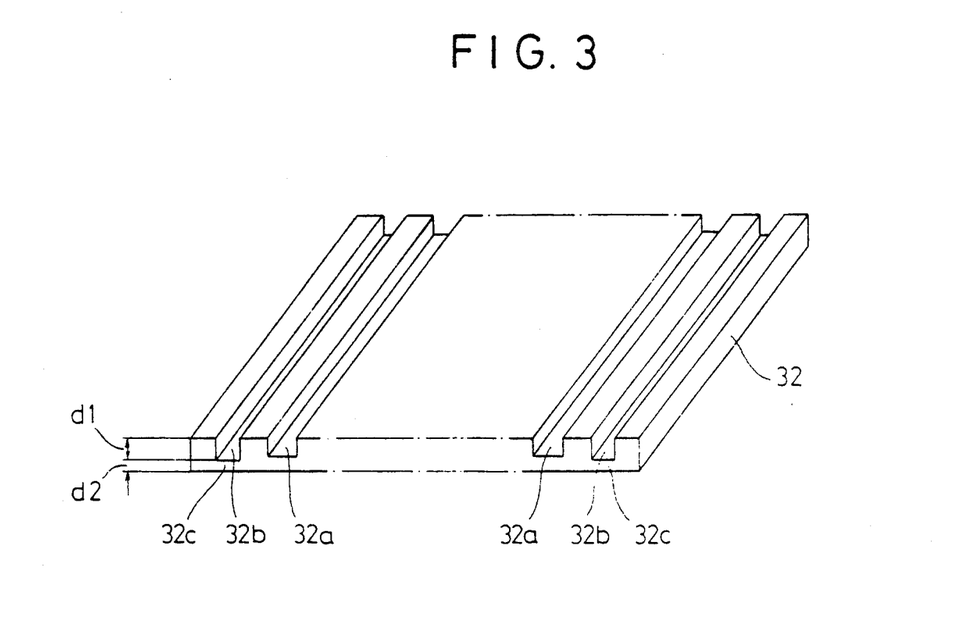
FIG. 3 is a perspective view of a porous carbonaceous plate with gas permeability, used in the electrode substrate unit of and the gas passage unit of FIG. 2.

The gas seals arranged at the opposing side portions of the gas permeable porous carbonaceous plate will be described in detail. The gas seals are important for preventing leakage of gases, particularly the fuel gas, from the opposite sides of the gas permeable porous carbonaceous plate. FIG. 3 shows the gas permeable porous carbonaceous plate 32 used in the electrode substrate unit 1 shown in FIG. 1 and the gas passage unit 3 shown in FIG. 2. As illustrated, two grooves 32b are formed in opposite side portions of the carbonaceous plate 32 such that they extend parallel to opposing two sides as well as the grooves 32a of the plate 32. If the width of the groove 32b is too broad, the effective area of the carbonaceous plate working as the electrode is reduced, and therefore, a larger amount of resin is required for filling the groove for sealing, thus causing inconveniences such as low cell performance and high cost. On the other hand, too narrow groove width incurs difficulty in filling the resin. Taking these into account, the sealing grooves 32b preferably have a width of from 0.5 to 15 mm, preferably from 1 to 10 mm; a still preferred width is in the range of from 1 to 3 mm.

Figure 4:
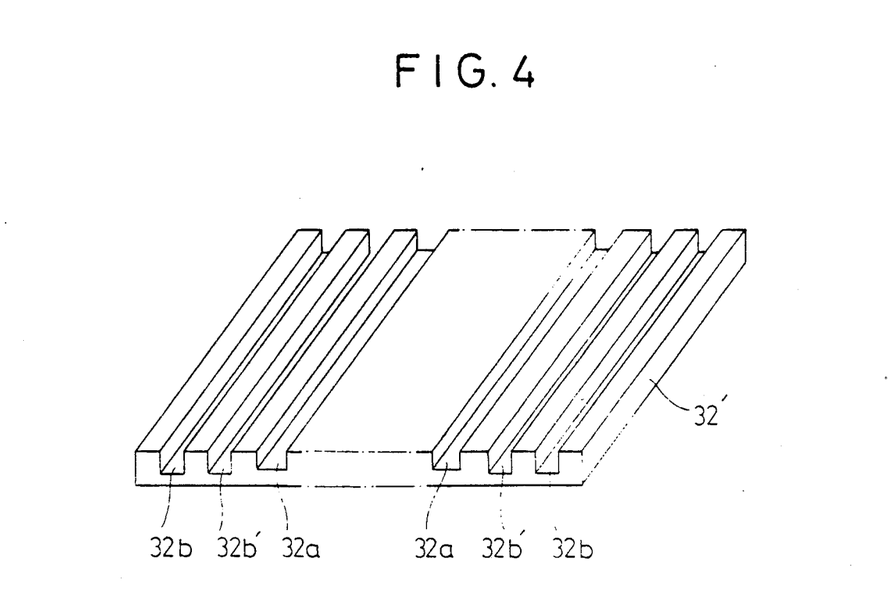
FIG. 4 is a perspective view illustrating a modification of gas permeable porous carbonaceous plate.

Depth d1 of the groove 32b may be varied depending on the thickness of the carbonaceous plate 32. To ensure the strength of the carbonaceous plate 32 and facilitate its handling, a web portion 32c appearing in the figure should have a thickness d2 of not smaller than 0.1 mm, preferably, not smaller than 0.2 mm. To increase the sealability of the seals 34, it is essential for the web portion 32c to be sufficiently impregnated with the thermoplastic resin used for bonding the carbonaceous plate 32 and the gas unpermeable electroconductive plate 30 together. In view of this, the thickness d2 of the web portion 32c should be as small as not greater than 1 mm, preferably not greater than 0.7 mm. As the sealing groove, a single groove may be formed in each of opposite side portions of the carbonaceous plate 32, as shown in FIG. 3; alternatively, two or more grooves for gas sealing (32b, 32b') may be formed in each of the opposite side portions, as illustrated in FIG. 4. The sealing grooves 32b can be cut together with the grooves 32a used for gas passage.

Figures 5, 6:
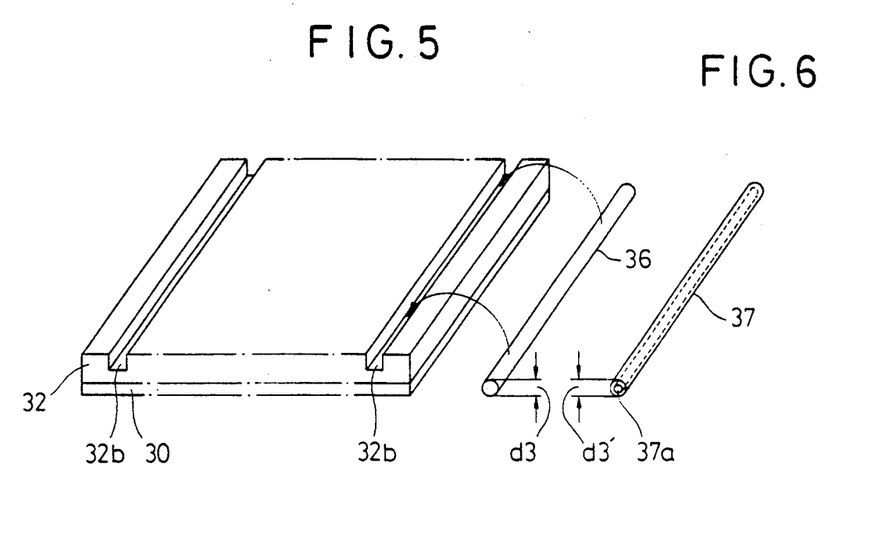
FIG. 5 is a perspective view illustrating how a solid rod-shaped resin is fitted in a sealing groove of the gas permeable porous carbonaceous plate of FIG. 3.
FIG. 6 is a perspective view showing a hollow rod-shaped resin to be fitted in the sealing groove of the gas permeable porous carbonaceous plate.

Then, rod-shaped thermoplastic resins to be fitted in the grooves 32b of the carbonaceous plate 32 are prepared. The same resin as used for bonding the gas permeable porous carbonaceous plate and the gas impermeable electroconductive plate, mentioned above, can be used for this purpose. The cross-sectional shape of the rod-like resin filler is not limited in particular; for example, the resin may be formed into a solid body 36, as shown in FIG. 5, or into a hollow body 37, as shown in FIG. 6. Although not shown, the resin may have a U- or C-shaped cross section. In any case, the resin rod should have such an outer diameter (d3, d3') that it can be received in the sealing groove 32b having the dimensions defined above.

The amount of the resin to be filled must be determined taking account of the amount of resin solidified in the sealing groove 32b, as well as the amount of resin penetrated into the carbonaceous plate 32 and solidified therein. In the case of using the solid resin filler 36, its cross-sectional area may preferably be 1.01-1.4 times the cross-sectional area of the sealing groove 32b; whereas in the case of the hollow resin filler 37 shown in FIG. 6, the cross-sectional area thereof may preferably be 0.8-1.2 times that of the sealing groove 32b, because the hollow portion 37a can be left even after the sealing step.

Figure 7:
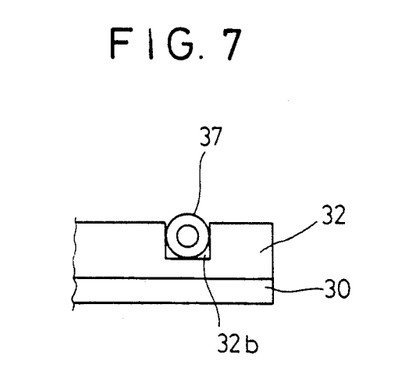
FIG. 7 is a front view showing part of the gas permeable porous carbonaceous plate and a resin properly fitted in the sealing groove of the plate.
Figure 8:
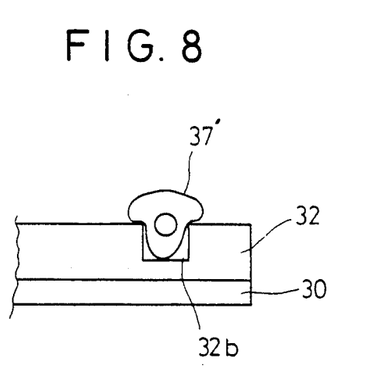
FIG. 8 is a front view showing part of the gas permeable porous carbonaceous plate and a resin improperly fitted in the sealing groove.

Subsequently, the solid resin 36 or hollow resin 37, prepared in the above manner, is fitted in each sealing groove 32b. In this case, the filler 37 may partly project upward from the surface of the carbonaceous plate 32, as shown in FIG. 7; but the situation must be avoided where the filler 37', as shown in FIG. 8, protrudes widthwise beyond the width of the sealing groove 32b. If the filler 37' protrudes in this manner, the surface of the carbonaceous plate 32 will be swollen excessively or too much resin will be penetrated into the surface region of the carbonaceous plate during the bonding step. Thus, if the resin contracts while it is solidified, the integrated substrate may be warped, for example, which leads to degradation of sealability.

Figure 9:
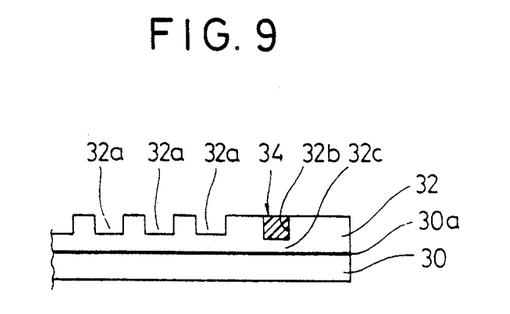
FIG. 9 is a front view of part of the gas permeable porous carbonaceous plate, illustrating a state in which a resin fitted in the sealing groove of the plate is solidified to form a gas seal after melted.

Then, the resin filled in this manner is heated under pressure so that the carbonaceous plate 32 is impregnated with part of the molten resin. This melt impregnation step is carried out under pressure using a press heated to a temperature at which the resin is melted, or to a temperature close thereto. The pressure applied by the press at this time may be 1-50 kgf/cm$^2$. The sealing portion 34 obtained in this manner is illustrated in FIG. 9. The molten resin is solidified in the sealing groove 32b and also in the web portion 32c impregnated with the resin; and the solidified resin, in cooperation with the resin penetrated into the web portion 32c from the bonded surfaces 30a of the carbonaceous plate 32 and the electroconductive plate 30 during the bonding step and solidified there, serves to prevent leakage of gases from the sides of the carbonaceous plate 32.

Since the resin filled in the sealing groove 32b has a shape of hollow or solid rod, the sealing groove 32b can be filled with a constant amount of resin without non-uniformity. Further, the resin can be easily fitted in the sealing groove 32b, and thus other portions than the grooves are not contaminated with the resin and handling of the resin is facilitated. To avoid the situation that because of excessive resin filled in the groove, the sealing groove is destroyed by the resin while the resin is heated under pressure, the hollow resin rod 37 shown in FIG. 6 can advantageously be used since the cavity 37a thereof serves to absorb variation of volume in some degree and facilitate sealing. The bonding step wherein the carbonaceous plate 32 and the electroconductive plate 30 are bonded together and the melt impregnation step wherein the carbonaceous plate 32 is impregnated with the resin filled in the groove 32b can be carried out at the same time; in this case, the fabrication process can be simplified and the costs can be reduced.

Figure 10:
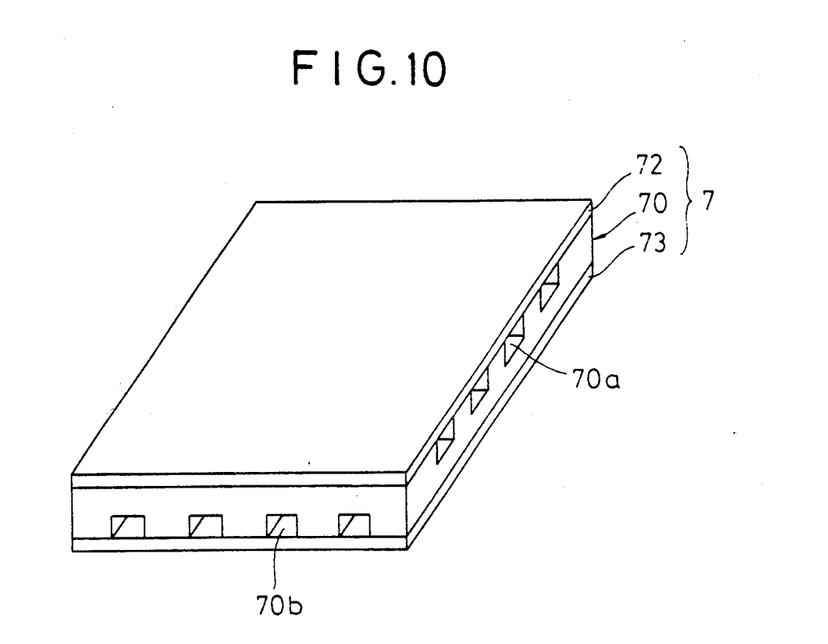
FIG. 10 is a perspective view illustrating another embodiment of electrode substrate unit for a fuel cell in which is used an electroconductive integrated substrate according to the invention.

FIG. 10 illustrates an electrode substrate unit 7 for a fuel cell, comprising a gas unpermeable electroconductive plate 70 having plural parallel grooves 70a and 70b for gas passage on opposite surfaces thereof, and planar gas permeable porous carbonaceous plates 72 and 73 bonded to the respective surfaces of the electroconductive plate 70. The grooves 70a formed in one surface of the gas unpermeable electroconductive plate 70 are at right angles to the grooves 70b formed in the other surface thereof. In the electrode substrate unit 7 of this embodiment, the electroconductive plate 70 functions as a separator for separating the fuel gas from the oxidative gas, and one of the carbonaceous plates, i.e., the plate 72, serves as a gas permeable electrode substrate for the fuel gas, whereas the other carbonaceous plate 73 serves as a gas permeable electrode substrate for the oxidative gas.

Figure 11:
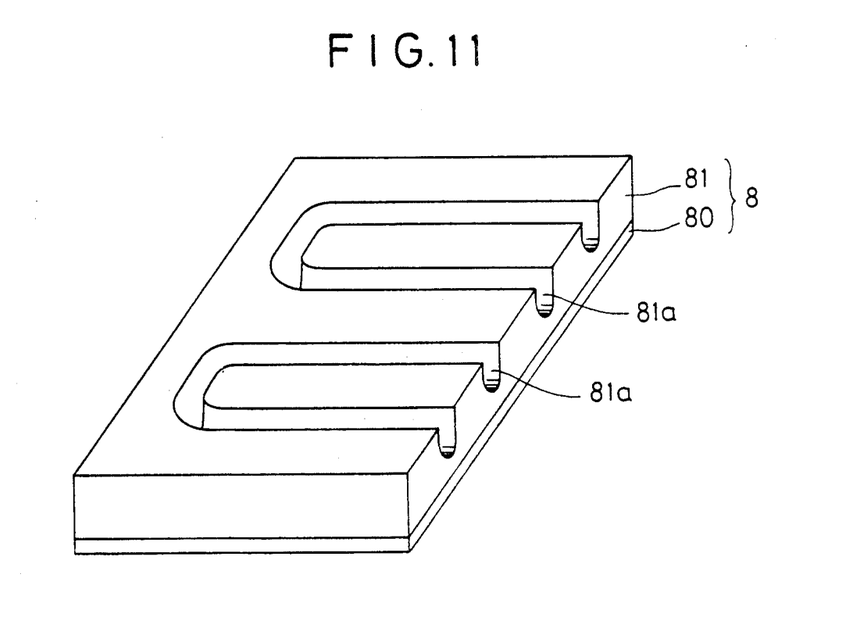
FIG. 11 is a perspective view illustrating a cooling unit for a fuel cell in which is used an electroconductive integrated substrate according to the invention.

FIG. 11 shows a cooling unit 8 for a fuel cell, which comprises a planar gas unpermeable electroconductive plate 80, and a gas permeable porous carbonaceous plate 81 bonded at one surface thereof to the electroconductive plate 80 and having numerous U-shaped parallel grooves 81a formed in the surface thereof opposite to the bonded surface. In use, a tube, not shown, for passing a cooling medium therethrough is placed in each groove 81a. In assembling a fuel cell, the cooling unit 8 is interposed between adjacent stacks of cell units, each stack including several cell units, to provide the function of removing heat generated on electrochemical reaction to outside.

Figure 12:
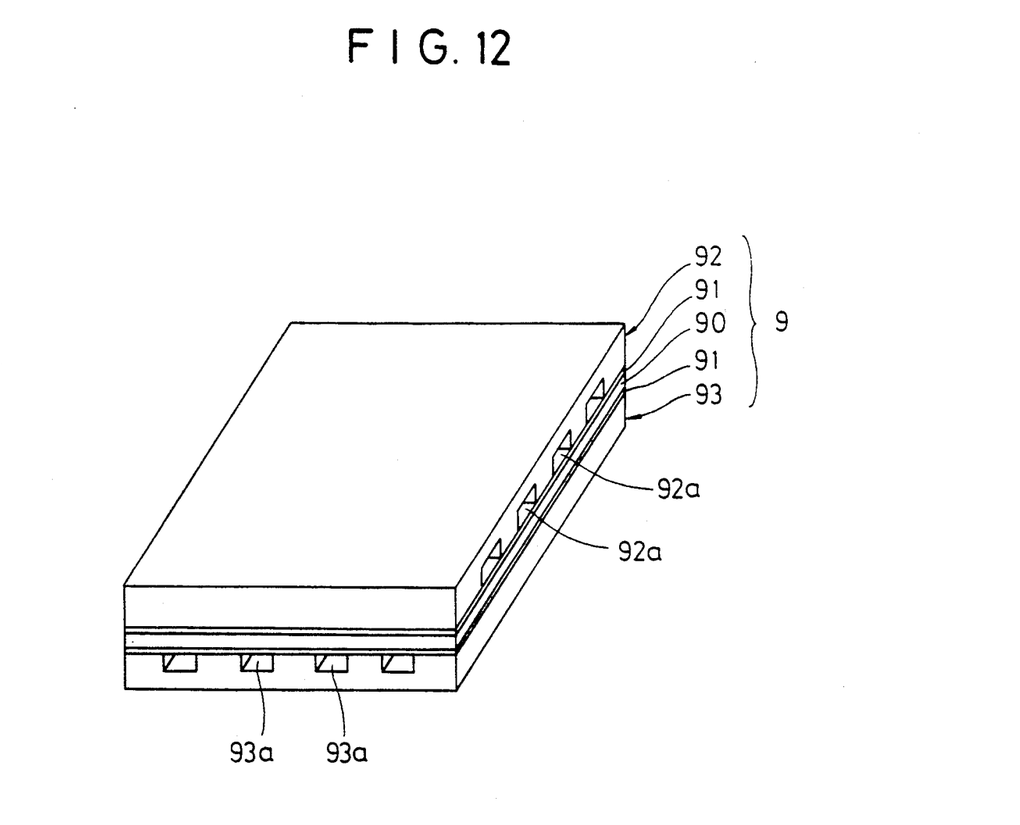
FIG. 12 is a perspective view illustrating still another embodiment of electrode substrate unit for a fuel cell in which is used an electroconductive integrated substrate according to the invention.

FIG. 12 shows an electrode substrate unit 9 for a fuel cell, using a combination of the aforementioned gas permeable porous carbonaceous plate 91 in which short carbon fibers are randomly dispersed within a 2-dimensional plane, and a gas permeable porous carbonaceous plates 92 and 93 in which short carbon fibers are dispersed randomly in three dimensions. The porous carbonaceous plate 91, in which short carbon fibers are randomly dispersed within a 2-dimensional plane, is bonded to opposite surfaces of the gas unpermeable electroconductive plate 90, and the porous carbonaceous plates 92 and 93 in which short carbon fibers are dispersed randomly in three dimensions are bonded to the respective carbonaceous plates 91. The carbonaceous plates 92 and 93 have plural parallel grooves 92a and 93a for gas passage, respectively, formed in the surface thereof bonded to the plate 91, and are disposed such that the grooves 92 are at right angles to the grooves 93a. In the same manner as described with reference to FIG. 1, the carbonaceous plates 91 are bonded to the electroconductive plate 90 and the carbonaceous plates 92 and 93 are bonded to the respective carbonaceous plates 91.

EXAMPLES

EXAMPLE 1

Polyacrylonitrile carbon fiber "TORAYCA" T300 (mean diameter of single filament: 7 μm; number of filaments: 6000), manufactured by Toray Industries, Inc., was cut to 12 mm long, and the cut fibers were mixed with a paper making medium containing polyvinyl alcohol as a paper making binder, stirred, and then subjected to paper making to obtain an intermediate.

Subsequently, the intermediate was impregnated with 10 parts by weight of methanolic solution of phenolic resin, to obtain attachment of 150 parts by weight of phenolic resin based on 100 parts by weight of the intermediate. The prepreg was dried at 90° C., and then is heated at 170° C. under pressure of 5 kgf/cm² for 15 minutes to cure the phenolic resin.

Next, the prepreg with the cured phenolic resin was heat treated at 2500° C. in argon gas atmosphere to carbonize the phenolic resin, thereby obtaining a gas permeable porous carbonaceous plate with a thickness of 2 mm. This carbonaceous plate had a mean pore diameter of about 40 μm, a porosity of about 72%, and an electrical resistance of 11.1 mΩ in the thickness direction.

Then, between two gas permeable porous carbonaceous plates obtained in the above manner, a glassy carbon plate GCR-101 as the gas unpermeable electroconductive plate (thickness: 1.5 mm; electrical resistance in the thickness direction: 1.22 mΩ), manufactured by Kobe Steel, Ltd., was placed with a PFA film "TOYOFLON" (thickness: 50 μm), manufactured by Toray Gosei Film K.K., interposed between the glassy carbon plate and the respective porous carbonaceous plate. The laminated structure was heated at 310° C. under pressure of 10 kgf/cm² to integrally bond the gas permeable porous carbonaceous plates and the glassy carbon plate together, thereby obtaining a gas passage unit for a fuel cell as shown in FIG. 2. In this example, no grooves were formed in the unit.

The electrical resistance of the obtained gas passage unit in the thickness direction, measured in accordance with the aforementioned measurement procedure, was 23.5 mΩ which is almost equal to the total resistance of the gas permeable porous carbonaceous plates and the glassy carbon plate, i.e., 23.4 mΩ. The gas passage unit was evaluated as to the impregnation capability of phosphoric acid electrolyte, and it was found that the unit could be impregnated with 0.248 g/cm² of phosphoric acid and therefore was most suited as the gas passage unit with a function of electrolyte reservoir for a phosphoric acid fuel cell.

EXAMPLE 2

A plurality of parallel grooves with a width of 2 mm, a depth of 1 mm, and with a pitch of 2 mm between adjacent ones were formed in one surface of the gas permeable porous carbonaceous plate obtained in EXAMPLE 1. The electrical resistance of the gas permeable porous carbonaceous plate in the thickness direction was 16.6 mΩ. The electrical resistance was measured under the condition that the gas permeable porous carbonaceous plate was sandwiched between carbonaceous electrodes and a current of 100 mA per unit area (1 cm²) was passed between the two electrodes under pressure of 5 kgf/cm², and was obtained by subtracting a voltage drop produced at the contact surfaces of the gas permeable porous carbonaceous plate and the carbonaceous electrodes, from a voltage drop per 1 cm². Then, following the same procedures as those in EXAMPLE 1, an electrode substrate unit for a fuel cell as shown in FIG. 1 was obtained.

The obtained electrode substrate unit has an electrical resistance of 34.6 mΩ in the thickness direction, which is almost equal to the total resistance 34.4 mΩ of the gas permeable porous carbonaceous plates and the glassy carbon plate.

EXAMPLE 3

Following the same steps as in EXAMPLE 1, two gas permeable porous carbonaceous plates with a thickness of 0.4 mm and an electrical resistance of 2.20 mΩ in the thickness direction were prepared. As the gas unpermeable electroconductive plate, a graphite plate T2172 (thickness: 5 mm), manufactured by Tokai Carbon Co., Ltd., was used, and grooves were formed in both surfaces of the graphite plate, as in EXAMPLE 2. The grooved graphite plate had an electrical resistance of 0.80 mΩ in the thickness direction.

Next, the gas permeable porous carbonaceous plates and the grooved graphite plate were bonded together, as in EXAMPLE 1, thereby obtaining an electrode substrate unit for a fuel cell as shown in FIG. 10.

The electrode substrate unit obtained had an electrical resistance of 5.50 mΩ in the thickness direction, which almost equals the total resistance 5.20 mΩ of the gas permeable porous carbonaceous plates and the graphite plate.

EXAMPLE 4

A pitch carbon fiber (mean diameter of single filament: 12 μm) manufactured by Union Carbide Corp., U.S.A., was cut to 6 mm long, and, following the same procedures as those in EXAMPLE 1, a gas permeable porous carbonaceous plate with a thickness of 2 mm was prepared. The carbonaceous plate had a mean pore diameter of about 90 μm, a porosity of about 75%, and an electrical resistance of 13.8 mΩ in the thickness direction. Subsequently, using the gas permeable porous carbonaceous plates thus obtained, an electrode substrate unit with no grooves for a fuel cell was obtained in the same manner as in EXAMPLE 1.

The electrode substrate unit obtained had an electrical resistance of 30.9 mΩ in the thickness direction almost equal to the total resistance 28.8 mΩ of the two gas permeable porous carbonaceous plates and the glassy carbon plate.

EXAMPLE 5

The carbon fiber used in EXAMPLE 4 was milled to a small length which is not greater than 1 mm, and the milled carbon fibers were dispersed in a solution of 45 parts by weight of phenolic resin based on 100 parts by weight of methanol, mixed, filtered, and then dried at 70° C.

Next, the dried mixture was pulverized, and 60 parts by weight of granular sugar that had been sifted to be 150–250 mesh were added based on 100 parts by weight of the mixture, followed by mixing. The mixture was filled in a mold and subjected to molding at 140° C. under pressure of 70 kgf/cm$^2$, and the molded structure was left to stand in warm water of 80° C. four 4 hours, and then is heat treated at 2500° C., thereby obtaining a gas permeable porous carbonaceous plate.

The obtained gas permeable porous carbonaceous plate in which short carbon fibers are randomly scattered in three dimensions had a thickness of 2.2 mm, a mean pore diameter of 50 $\mu$m, and a porosity of 63%.

Subsequently, plural parallel grooves with a width of 2 mm, a depth of 1.1 mm and with a pitch of 2 mm between adjacent ones were formed in one surface of the above gas permeable porous carbonaceous plate. The grooved carbonaceous plate had an electrical resistance of 18.1 m$\Omega$ in the thickness direction.

Then, following the same procedures as those in EXAMPLE 1, an electrode substrate unit for a fuel cell as shown in FIG. 1 was obtained.

The electrical resistance of the obtained electrode substrate unit in the thickness direction was 40.7 m$\Omega$. The total resistance of the two gas permeable porous carbonaceous plates and the glassy carbon plate was 37.4 m$\Omega$.

EXAMPLE 6

Using a gas permeable porous carbonaceous plate with a thickness of 0.1 mm (electrical resistance in the thickness direction: 0.55 m$\Omega$), obtained in the same manner as in EXAMPLE 1, and the gas permeable porous carbonaceous plate used in EXAMPLE 5, an electrode substrate unit for a fuel cell as shown in FIG. 12 was obtained, following the same procedures as those in EXAMPLE 1.

The electrode substrate unit obtained had an electrical resistance of 42.0 m$\Omega$ in the thickness direction, which almost equals the total resistance 38.5 m$\Omega$ of the gas permeable porous carbonaceous plates and the glassy carbon plate.

EXAMPLE 7

Similar to EXAMPLE 1, a gas permeable electroconductive plate with a thickness of 3 mm and an electrical resistance of 21.9 m$\Omega$ in the thickness direction was obtained. The electroconductive plate thus obtained was laminated on a glassy carbon plate GCR-101 (thickness: 1.5 mm; electrical resistance in the thickness direction: 1.22 m$\Omega$), manufactured by Kobe Steel, Ltd., with a PFA film "TOYOFLON" 50P (thickness: 100 $\mu$m), manufactured by Toray Gosei Film K.K., interposed therebetween. Then, the same procedures as those in EXAMPLE 1 were followed to obtain a cooling unit as shown in FIG. 11.

The obtained cooling unit had an electrical resistance of 23.4 m$\Omega$ in the thickness direction which almost equals the total resistance 23.1 m$\Omega$ of the gas permeable porous carbonaceous plate and the glassy carbon.

EXAMPLE 8

Following the same procedures as those in EXAMPLE 1 except that a PFEP film "TOYOFLON" 50F (thickness: 50 $\mu$m), manufactured by Toray Gosei Film K.K., was used instead of PFA film, and that the bonding step was conducted at 320° C. under pressure of 10 kgf/cm$^2$, a gas passage unit as shown in FIG. 2 was obtained. No grooves were formed in the unit.

The obtained gas passage unit had an electrical resistance of 24.6 m$\Omega$ in the thickness direction almost equal to the total resistance 23.4 m$\Omega$ of the gas permeable porous carbonaceous plate and the glassy carbon plate.

EXAMPLE 9

A PES film "TALPA" 1000 (thickness: 50 $\mu$m), manufactured by MITSUI TOATSU CHEMICALS, INC., was used instead of PFA film, and the bonding step was conducted at 350° C. under pressure of 10 kgf/cm$^2$. Except for these, the same procedures as those in EXAMPLE 1 were followed to obtain a gas passage unit for a fuel cell as shown in FIG. 2. No grooves were formed.

The obtained gas passage unit had an electrical resistance of 24.1 m$\Omega$ in the thickness direction which is almost equal to the total resistance 23.4 m$\Omega$ of the gas permeable porous carbonaceous plates and the glassy carbon plate.

EXAMPLE 10

The same procedures as in EXAMPLE 1 were followed except for the use of a PFA film with a thickness of 25 $\mu$m and for the bonding step which was conducted at 350° C. under pressure of 10 kgf/cm$^2$, to obtain a gas passage unit for a fuel cell as shown in FIG. 2. In this case, no grooves were formed.

The obtained gas passage unit had an electrical resistance of 23.4 m$\Omega$ in the thickness direction almost equal to the total resistance 23.4 m$\Omega$ of the two gas permeable porous carbonaceous plates and the glassy carbon plate.

EXAMPLE 11

Instead of using a PFA film, a polypropylene film "TORAYFAN" #3300 (thickness: 50 $\mu$m), manufactured by Toray Gosei Film K.K., was used, and, following the same steps as in EXAMPLE 1 except that the bonding step was conducted at 180° C. under pressure of 15 kgf/cm$^2$, a gas passage unit for a fuel cell as shown in FIG. 2 was obtained. No grooves were formed.

The obtained gas passage unit had an electrical resistance of 24.7 m$\Omega$ in the thickness direction which almost equals the total resistance 23.4 m$\Omega$ of the two gas permeable porous carbonaceous plates and the glassy carbon plate.

EXAMPLE 12

A polyethylene film (thickness: 50 $\mu$m) manufactured by Sankyo Polyethylene K.K. was used instead of PFA film, and, following the same procedures as those in EXAMPLE 1 except that the bonding step was conducted at 200° C. under pressure of 15 kgf/cm$^2$, a gas passage unit for a fuel cell as shown in FIG. 2 was obtained. No grooves were formed in the unit.

The obtained gas passage unit had an electrical resistance of 23.6 m$\Omega$ in the thickness direction almost equal to the total resistance 23.4 m$\Omega$ of the two gas permeable porous carbonaceous plates and the glassy carbon plate.

EXAMPLE 13

Instead of using a PFA film, a polyvinylidene fluoride film KF SHEET P20 (thickness: 50 μm), manufactured by Kureha Chemical Industry Co., Ltd., was used, and the bonding step was conducted at 250° C. under pressure of 10 kgf/cm². Except for these, the same procedures as those in EXAMPLE 1 were followed to obtain a gas passage unit for a fuel cell as shown in FIG. 2. No grooves were formed.

The gas passage unit obtained had an electrical resistance of 23.9 mΩ in the thickness direction almost equal to the total resistance 23.4 mΩ of the two gas permeable porous carbonaceous plates and the glassy carbon plate.

EXAMPLE 14

An electrolytic copper foil DT-70 as the gas unpermeable electroconductive plate (thickness: 70 μm; electrical resistance in the thickness direction: 0.01 mΩ), manufactured by MITSUI MINING AND SMELTING CO., LTD., was sandwiched between two gas permeable porous carbonaceous plates used in EXAMPLE 1, with a polypropylene film "TORAYFAN" #3300 (thickness: 25 μm), manufactured by Toray Gōsei Film K.K., interposed between the foil and each carbonaceous plate. Except that the bonding step was conducted at 180° C. under pressure of 15 kgf/cm², the procedures similar to those of EXAMPLE 1 were followed, to obtain a gas passage unit for a fuel cell, as shown in FIG. 2, with no grooves formed therein.

The obtained gas passage unit had an electrical resistance of 23.8 mΩ in the thickness direction, which nearly equals the total resistance 22.2 mΩ of the two gas permeable porous carbonaceous plates and the electrolytic copper foil.

EXAMPLE 15

A polyamide film "RAYFAN" T1401#50 (thickness: 50 μm), manufactured by Toray Gōsei Film K.K., was used instead of PFA film, and, following procedures similar to those of EXAMPLE 1 except for the bonding step which was conducted at 250° C. under pressure of 10 kgf/cm², a gas passage unit for a fuel cell as shown in FIG. 2 was obtained. No grooves were formed in the unit.

The gas passage unit obtained had an electrical resistance of 24.8 mΩ in the thickness direction which almost equals the total resistance 23.4 mΩ of the two gas permeable porous carbonaceous plates and the glassy carbon plate.

EXAMPLE 16

Following the same procedures as those in EXAMPLE 1 except that a polyester film "LUMIRROR" #25T70 (thickness: 25 μm), manufactured by Toray Industries, Inc., was used instead of PFA film and that the bonding step was conducted at 250° C. under pressure of 10 kgf/cm², a gas passage unit for a fuel cell as shown in FIG. 2 was obtained, with no grooves formed therein.

The obtained gas passage unit had an electrical resistance of 24.5 mΩ in the thickness direction which nearly equals the total resistance 23.4 mΩ of the two gas permeable porous carbonaceous plates and the glassy carbon plate.

EXAMPLE 17

A polyetheretherketone film "TALPA" 2000 (thickness: 50 μm), manufactured by MITSUI TOATSU CHEMICALS, INC., was used instead of PFA film, and the bonding step was conducted at 250° C. under pressure of 10 kgf/cm². Except for these, the same procedures as those in EXAMPLE 1 were followed to obtain a gas passage unit for a fuel cell as shown in FIG. 2. No grooves were formed.

The gas passage unit obtained had an electrical resistance of 24.6 mΩ in the thickness direction which is almost equal to the total resistance 23.4 mΩ of the two gas permeable porous carbonaceous plates and the glassy carbon plate.

What is claimed is:

1. An electroconductive integrated substrate comprising:
   at least one gas impermeable electroconductive plate; and
   at least one porous carbonaceous plate having a large number of pores and having gas permeability, said at least one porous carbonaceous plate being laminated over one surface of said at least one gas impermeable electroconductive plate and integrally bonded thereto by thermoplastic resin which is present substantially only in the pores of said porous carbonaceous plate, said at least one porous carbonaceous plate comprising short carbon fibers, having a diameter of single fiber of from 4 to 15 μm and a fiber length of from 2 to 20 mm, which are randomly dispersed within a substantially 2-dimensional plane and are bonded with each other by carbonized resin, and said at least one porous carbonaceous plate having a mean pore diameter of from 20 to 150 μm and a porosity of from 40 to 85%.

2. The electroconductive integrated substrate according to claim 1, wherein said thermoplastic resin consists of one or more selected from the group of a copolymerizate of tetrafluoroethylene and perfluoroalkylvinylether, a copolymerizate of tetrafluoroethylene and hexafluoropropylene, polyether sulfone, polyvinyl chloride, polyvinylidene chloride, polyethylene, polypropylene, polyamide, polysulfone, polyester, polyphenylene sulfide, polyether sulfone, polyetheretherketone, polyvinylidene fluoride, fluorine-contained polyester, and fluorine-contained acrylic acid resin.

3. The electroconductive integrated substrate according to claim 1, wherein said porous carbonaceous plate has a mean pore diameter of from 20 to 150 μm and a porosity of from 40 to 85%.

4. The electroconductive integrated substrate according to claim 3, wherein said porous carbonaceous plate comprises short carbon fibers, having a diameter of single fiber of from 4 to 15 μm and a fiber length of from 2 to 20 mm, which are randomly dispersed within substantially a 2-dimensional plane and are bonded with each other by carbonized resin.

5. The electroconductive integrated substrate according to claim 1, which comprises two porous carbonaceous plates and one gas impermeable electroconductive plate, and wherein said two porous carbonaceous plates are integrally bonded to both surfaces of said one gas impermeable electroconductive plate, respectively.

6. The electroconductive integrated substrate according to claim 1, which has an electrical resistance ΔR of not greater than 7 mΩ at the bonded surface thereof in the thickness direction, in accordance with the following formula:

$$\Delta R = \left( R - \sum_{i=1}^{N} R_i \right)/(N - 1)$$

wherein R and Ri represent, respectively, the electrical resistance mΩ in the thickness direction of the bonded structure comprising j porous carbonaceous plates, wherein j=1 or more, and k gas impermeable electroconductive plates, wherein k=1 or more, and the electrical resistance mΩ in the thickness direction of an i-th one of the j porous carbonaceous plates and k gas impermeable electroconductive plates constituting said bonded structure, and N represents the total number of the j porous carbonaceous plates and the k gas impermeable electroconductive plates bonded together so that N=j+k, said electrical resistance in the thickness direction being calculated from a voltage drop per unit area of 1 cm² measured when a current of 100 mA is passed per unit area between electrodes sandwiching a plate to be measured therebetween.

7. The electroconductive integrated substrate according to claim 6, wherein said electrical resistance ΔR at the bonded surface in the thickness direction is not greater than 1.5 mΩ.

8. The electroconductive integrated substrate according to claim 1, which comprises gas seal means arranged in parallel with each of at least two opposite side edges of said at least one porous carbonaceous plate, for preventing leakage of gases.

9. The electroconductive integrated substrate according to claim 8, wherein said gas seal means comprises a sealing groove formed in said at least one porous carbonaceous plate along said side edge thereof, and a rod-shaped thermoplastic resin filled in said sealing groove, said thermoplastic resin being melted and solidified in such a manner that part of the molten resin is solidified in said sealing groove whereas the remaining molten resin penetrates into regions of said at least one porous carbonaceous plate surrounding said sealing groove and is solidified in said regions.

10. The electroconductive integrated substrate according to claim 1, which is used as a functional element for a fuel cell.

11. An electroconductive integrated substrate comprising:
at least one gas impermeable electroconductive plate; and
at least one porous carbonaceous plate having a large number of pores and having gas permeability, said at least one porous carbonaceous plate being laminated over one surface of said at least one gas impermeable electroconductive plate and integrally bonded thereto by thermoplastic resin which is present substantially only in the pores of said porous carbonaceous plate and which has a melting viscosity of from $10^2$ to $10^6$ poises, said at least one porous carbonaceous plate comprising short carbon fibers, having a diameter of single fiber of from 4 to 15 μm and a fiber length of from 2 to 20 mm, which are randomly dispersed within a substantially 2-dimensional plane and are bonded with each other by carbonized resin, and said at least one porous carbonaceous plate having a mean pore diameter of from 20 to 150 μm and a porosity of from 40 to 85%.

12. A process for producing an electroconductive integrated substrate, comprising the steps of:
preparing at least one porous carbonaceous plate having a large number of pores and having gas permeability;
preparing at least one gas impermeable electroconductive plate;
laminating said at least one porous carbonaceous plate over one surface of said at least one gas impermeable electroconductive plate with a thermoplastic resin film interposed therebetween; and
heating the laminated structure thus obtained under pressure, thereby melting said thermoplastic resin film to bond said at least one porous carbonaceous plate and said at least one gas impermeable electroconductive plate together,
said at least one porous carbonaceous plate comprising short carbon fibers, having a diameter of single fiber of from 4 to 15 μm and a fiber length of from 2 to 20 mm, which are randomly dispersed within a substantially 2-dimensional plane and are bonded with each other by carbonized resin, and said at least one porous carbonaceous plate having a mean pore diameter of from 20 to 150 μm and a porosity of from 40 to 85%.

13. The process according to claim 12, wherein said thermoplastic resin film consists of one or more selected from the group of a copolymerizate of tetrafluoroethylene and perfluoroalkylvinylether, a copolymerizate of tetrafluoroethylene and hexafluoropropylene, polyether sulfone, polyvinyl chloride, polyvinylidene chloride, polyethylene, polypropylene, polyamide, polysulfone, polyester, polyphenylene sulfide, polyether sulfone, polyetheretherketone, polyvinylidene fluoride, fluorine-contained polyester, and fluorine-contained acrylic acid resin.

14. The process according to claim 12, wherein said thermoplastic resin film has a thickness of from 10 to 200 μm.

15. The process according to claim 12, wherein said porous carbonaceous plate has a mean pore diameter of from 20 to 150 μm and a porosity of from 40 to 85%.

16. The process according to claim 15, wherein said porous carbonaceous plate includes short carbon fibers, having a diameter of single fiber of from 4 to 15 μm and a fiber length of from 2 to 20 mm, which are randomly dispersed within substantially a 2-dimensional plane and are bonded with each other by carbonized resin.

17. The process according to claim 12, wherein said porous carbonaceous plate and said electroconductive plate are bonded together under pressure of from 5 to 20 kgf/cm².

18. The process according to claim 12, wherein thermoplastic resin film has a melting viscosity of $10^2$ to $10^6$ poises, and, after said heating step, is present substantially only in the pores of said at least one porous carbonaceous plate laminated on said at least one gas impermeable electroconductive plate.

* * * * *